April 6, 1954

C. E. FRANK
SUSPENSION SYSTEM 2,674,450

Filed June 25, 1948

Inventor
Clarence E. Frank
By
Spencer, Willits, Helmig & Baillio
Attorneys

April 6, 1954
C. E. FRANK
2,674,450
SUSPENSION SYSTEM
Filed June 25, 1948
2 Sheets-Sheet 2
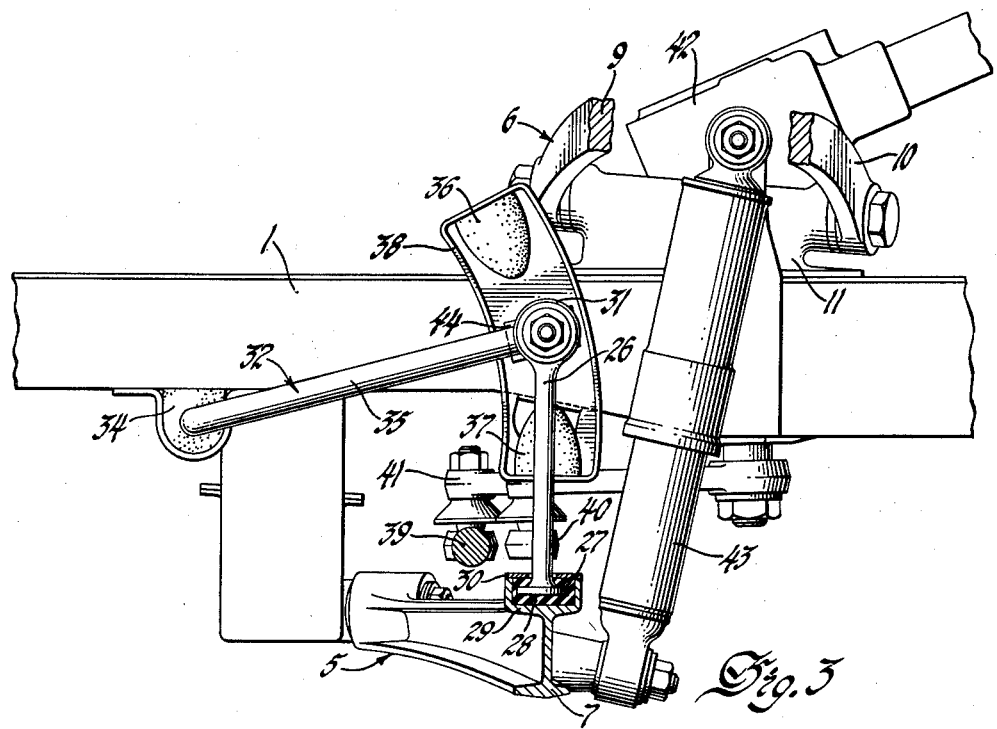
Fig. 3
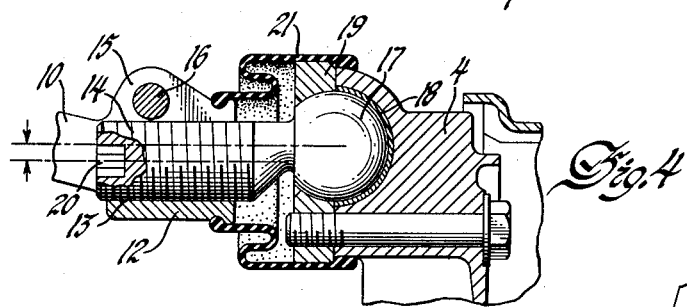
Fig. 4
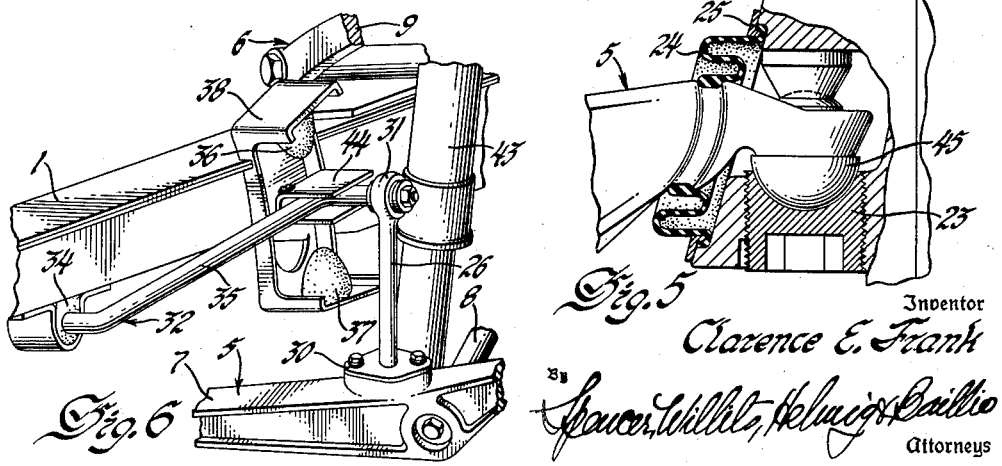
Fig. 5
Fig. 6
Inventor
Clarence E. Frank
By Spencer, Willets, Helmig & Caillio
Attorneys Patented Apr. 6, 1954

2,674,450

UNITED STATES PATENT OFFICE 2,674,450

SUSPENSION SYSTEM

Clarence E. Frank, Fraser, Mich., assignor to General Motors Corporation, Detroit, Mich., a corporation of Delaware Application June 25, 1948, Serial No. 35,129

7 Claims. (Cl. 267—11)

This invention relates to suspension systems for controlling relative movement between resiliently interconnected members, for example the road wheels and the frame of an automotive or other vehicle. While certain features thereof are believed to have broad application to suspension systems generally, the invention as a whole is more directly concerned with improvements in automotive vehicle suspensions, particularly independent suspensions from dirigible road wheels.

One of the more common independent suspension arrangements in use at the front road wheels of automobiles today employs upper and lower transverse swing links of wishbone shape interconnecting the wheel structure and the frame of the vehicle, with spring means interposed between the frame and one of the links to support the weight of the car. Coil type springs are most commonly used, and their abutment with the frame is taken by an overhang or extension of a frame cross-member beyond the lateral extremity of the frame side sill. To obtain the desired softness of ride, low rate springs are used and their range of deflection is limited by stops in the form of rubber bumpers fixed to the cross-member overhang in position to abut the upper and lower wishbone links at "bump" and "rebound," respectively. Various means have been used to provide adjustability of the wheel relative to the links for obtaining proper caster and camber. Further, to compensate for the inherently low resistance to vehicle roll provided by such a suspension, it is preferable to provide an anti-roll stabilizer, which most commonly consists of a transverse torsion bar spring journaled on the frame and connected at each end through crank arms to one or the other of the wishbone links adjacent the respective wheels.

It is among the objects of my invention to improve such a suspension by reducing the weight and cost thereof, particularly the vehicle frame, through eliminating the need for an overhang of the frame cross-member.

It is also an object of my invention to provide an improved caster and camber adjustment means for such a suspension.

Other objects and advantages in my invention will be apparent from the following detailed description, having reference to the drawings in which:

Figure 1 is a plan view of an automotive vehicle dirigible wheel suspension embodying my invention.

Figures 2 and 3 are elevational views thereof taken from lines 2—2 and 3—3 of Figure 1, respectively, with parts broken away and in section.

Figures 4 and 5 are enlarged views of details as shown in Figure 2, with parts broken away and in section.

Figure 6 is a perspective view of a portion of the suspension, taken from a position somewhat above and to the right of the view of Figure 2.

Figure 1:
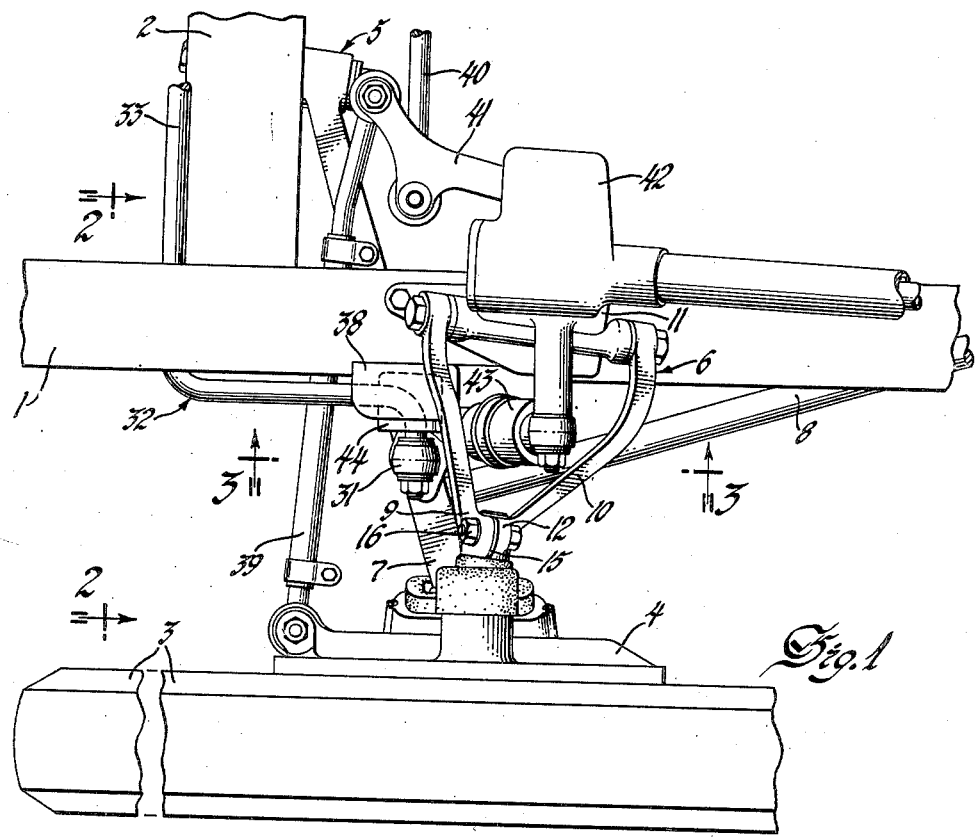
Figure 2:
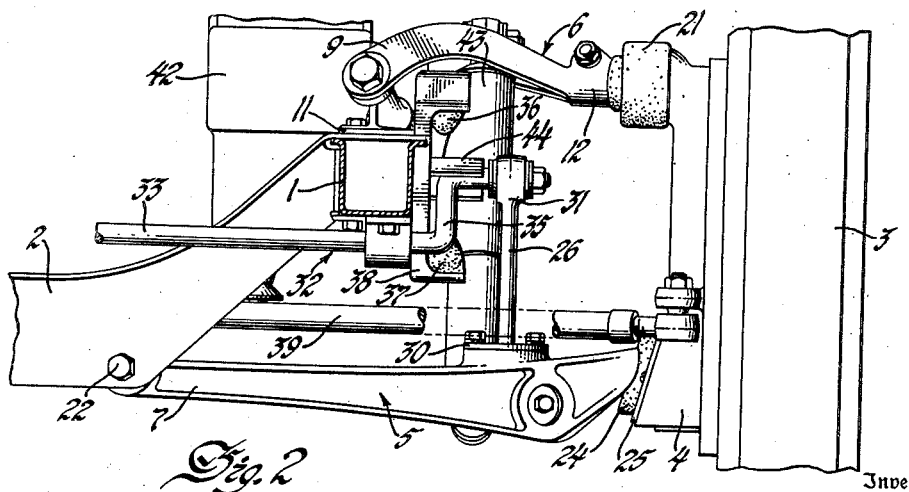

In the drawings is shown a supported member in the form of an automotive vehicle frame comprising a side sill 1 fixedly joined to one end of a cross-member 2, and a supporting member in the form of a dirigible left front road wheel 3 mounted on a wheel carrier 4. The wheel is guided in its vertical movements relative to the frame by lower and upper transverse links 5 and 6 of wishbone shape, and comprising front and rear arms 7, 8 and 9, 10, respectively.

The divergent inner ends of the upper wishbone arms 9 and 10 are pivoted to a bracket 11 fixed to the side sill 1, and their outer ends are integral with each other and form a boss 12 having an internally threaded aperture 13 (see Figure 4) extending therethrough approximately normal to the pivotal axis of the inner ends of the arms for receiving a threaded pin 14. The boss 12 is also slit longitudinally with the aperture 13 as at 15 and is provided with a clamping bolt 16 for drawing it tightly about the threaded pin. A ball 17 integral with and eccentrically disposed on the outer end of the pin 14 is secured to a spherical bearing seat 18 on the wheel carrier 4 by means of a spherically apertured retainer 19. The inner end of the pin 14 is provided with a hexagonal or other non-circular wrench socket 20 by means of which the pin may be turned to adjustably position the same relative to the boss 12 in making adjustments of wheel caster and/or camber, and a flexible sleeve-like boot or dust cover 21 of rubber or similar material encloses the joint between the ball and the wheel carrier. The dust cover is provided with an annular S section plait intermediate its ends, which are internally flanged to snugly engage the boss 12 and wheel carrier 4, thereby allowing for ample angular flexing without sliding friction and wear.

The lower link front arm 7 is pivoted at its inner end to a pintle 22 secured to the frame cross-member 2 and is universally connected at its outer end to the wheel carrier 4 through a ball and socket joint of any desired construction, that being shown in Figure 5 comprising a spherically ended pin 45 resting on a spherically recessed bearing member 23 threadedly secured in the wheel carrier. A flexible dust cover 24, similar to cover 21 except provided with a retaining ring 25 at the wheel carrier end, is provided.

The rear arm 8 of the lower link acts as a torsion bar spring in supporting the vehicle, being splined or otherwise fixed at its outer end to the lower link front arm 7 near the outer end of the latter and anchored at its inner end (not shown) to the frame through a member which is journaled to the frame on an axis generally horizontal and perpendicular to the rear arm 8. The means for anchoring the rear arm 8 to the frame is incidental to the instant invention and is fully disclosed in an application, Serial No. 5660, of Louis Thoms, filed January 31, 1948, now Patent No. 2,596,922.

Extending vertically upward from the lower link front arm 7 and near the outer end thereof is a column-like member or post 26 which is resiliently anchored in any desired manner at its lower end to the arm 7. As shown in Figure 3, the post 26 is provided at its lower end with an enlargement or flange 27 which is embedded in a body of rubber 28 confined within an upwardly open recessed boss 29 formed on the top of the arm 7 and covered by a closure plate 30. The upper end of the post 26 is provided with a transverse eye 31.

The right hand road wheel (not shown) is connected to the vehicle frame in a manner corresponding to that described above for the lefthand wheel, and pivotally connected at its respective ends to the eye 31 and a similar eye for the right hand wheel is an anti-roll bar or stabilizer 32 of conventional U-shape for resiliently resisting relative vertical movement between the two road wheels. The intermediate section 33 of the stabilizer which is subjected to torsional stressing in operation extends transversely of the vehicle and is journaled in rubber bearings, such as shown at 34, mounted to the frame side sills. Integral with or otherwise fixedly secured to each end of the intermediate section is a crank arm 35 extending longitudinally of the vehicle and to one side of the post eye 31, opposite which and adjacent its pivotal connection thereto it extends between two vertically spaced stops or bumpers 36 and 37 preferably of rubber or similar material which are fixed to the frame as by a bracket 38 secured to the frame side member 1. To provide suitable abutment surfaces opposite the bumpers, the crank arm 35 may be provided with a U-shaped pad 44 welded or otherwise fixed thereto.

Also shown in the drawings are a conventional direct acting shock absorber 43 which is connected between the lower link front arm 7 and the frame side sill 1 through the bracket 11 fixed thereon, and a conventional steering linkage comprising tie rods 39 and 40, pitman arm 41 and gear housing 42.

As is believed apparent from the drawings and the description heretofore given, swinging movements of the stabilizer crank arm 35 accompanying relative vertical displacements of the wheel and frame are limited to the range provided by the spacing of the bumpers 36 and 37. The use of the inexpensively formed bracket 38 for mounting the rubber bumpers and attaching it to the frame side sill considerably reduces the cost and weight of the frame cross-member 2, which on front engine automotive vehicles must be positioned a substantial distance forward of the wheel line to support the front end of the engine, and which otherwise must be raked backward at its outer ends and extended outward from the side sills to provide a mounting for the rubber bumpers near the wheel line. Also, the bracket 38 being adapted to limit swinging movements of the stabilizer crank arm 35 provides a very simplified means of controlling wheel "bounce" and "rebound." The post 26, having a certain amount of freedom to swing about its connection with the lower link 5, is a necessary element to the application of pure torsion in the intermediate section 33 of the stabilizer 32 in resisting roll of the vehicle body relative to the wheels; and the instant invention provides it with the additional function of transmitting wheel "bounce" and "rebound" forces between the swinging end of the stabilizer crank arm 35 and the lower wishbone link 5.

I claim:

1. In an automotive vehicle; a pair of road wheels; a body frame disposed between the wheels and comprising longitudinal side sills defining the lateral extremities of the frame; a carrier for each wheel; a transverse link extending between and pivotally connected with each carrier and the frame, for guiding vertical movements of the respective wheels relative to the frame; a vertical post anchored to each of the links near their respective wheel carriers; a torsionally resilient member extending transversely of the frame; arms rigidly connected to the member and pivotally connected to the respective posts; and arm engageable bumpers of rubber or like material for stopping extreme vertical movements of the wheels relative to the frame, said bumpers being positioned above and below each arm adjacent its connection with the post and being secured to the frame by a bracket attached to the adjacent side sill.

2. In an automotive vehicle; a body frame; a pair of road wheels adjacent one end of the frame; a carrier for each of the wheels; a rigid transverse link for each wheel for guiding its vertical movement relative to the frame, and pivotally connected at its respective ends to the frame and wheel carrier; a torsionally resilient member extending transversely of the frame and axially rotatable freely thereof; arms rigidly connected to the respective ends of the resilient member and pivotally connected to the respective links near the wheel carriers; and arm engageable bumper members fixed to the frame above and below the arms at points adjacent their connections to the links, for limiting extreme vertical movements of the wheels relative to the frame.

3. In an automotive vehicle; a body frame; a pair of road wheels adjacent one end of the frame; a carrier for each of the wheels; a rigid transverse link for each wheel for guiding vertical movements thereof relative to the frame, and pivotally connected to the frame and carrier; a generally horizontal U-shaped torsionally resilient member pivotally connected at its respective ends to the transverse links adjacent the wheels; and upper and lower bumper members fixed to the frame in positions to abut the U-shaped member at points adjacent its pivotal connections with the transverse links under conditions of extreme upward and downward travel of the wheels relative to the frame.

4. In an automotive vehicle, a body frame, a pair of independently sprung road wheels adjacent one end of the frame, a carrier for each of the wheels, means suspending the respective carriers from the frame and guiding their vertical movements relative to the frame, A U-shaped roll stabilizer member extending transversely of the frame and having its respective ends connected to said means adjacent the carriers in a manner to resist relative vertical movement of the carriers, and bumper members fixed to the frame above and below the ends of the U-shaped member in positions to engage said ends and thereby limit extreme vertical movements of the wheels.

5. In an automotive vehicle, a vehicle frame, a pair of road wheels, means independently suspending said wheels from the frame, a bar interconnecting the suspending means for the wheels and having its intermediate section offset from the wheel axes and rotatably secured to the frame, and upper and lower bumper members secured to the frame and engageable with the bar adjacent the respective ends of the bar for limiting extreme vertical movements of the wheels relative to the frame.

6. In a vehicle having at least two road engaging elements, a supporting member for each said element, a member suspended from each of said supporting members, a stabilizer controlling relative displacement between said respective elements and said suspended member, said stabilizer including a relatively resilient part journalled for free rotation by said suspended member and relatively rigid load applying cranks connecting said part to said such supporting members, respectively, abutment means in fixed relation with the stabilizer journalling member and arranged to operatively engage vertically opposite surfaces of each said crank adjacent its connection to its associated supporting member.

7. In a vehicle, two relatively displaceable members, a third member suspended from each of said two members, a stabilizer controlling relative displacement between said two members and said third member having a resilient load absorbing part rotatably carried by said third member and load applying other parts connecting said part respectively to said two members, means fixedly associated with the stabilizer carrying member and adapted to operatively engage vertically opposite surfaces of each said other part adjacent its connection to its associated displaceable member and limit the movement thereof relative to said stabilizer carrying member.

References Cited in the file of this patent

UNITED STATES PATENTS

| Number | Name | Date |
| --- | --- | --- |
| 2,027,577 | Crane | Jan. 14, 1936 |
| 2,060,015 | Barnes et al. | Nov. 10, 1936 |
| 2,123,089 | Leighton | July 5, 1938 |
| 2,190,298 | Slack | Feb. 13, 1940 |
| 2,254,325 | Slack et al. | Sept. 2, 1941 |
| 2,371,864 | Woolson et al. | Mar. 20, 1945 |
| 2,405,458 | Slack et al. | Aug. 6, 1946 |
| 2,409,501 | Krotz | Oct. 15, 1946 |
| 2,438,432 | Edwards | Mar. 23, 1948 |
| 2,477,822 | Probst | Aug. 2, 1949 |
| 2,507,108 | Lange | May 9, 1950 |
| 2,556,767 | McCann | June 12, 1951 |

FOREIGN PATENTS

| Number | Country | Date |
| --- | --- | --- |
| 500,610 | Great Britain | Feb. 13, 1939 |